(12) United States Patent
Ruhe, Jr.

(10) Patent No.: US 9,957,461 B2
(45) Date of Patent: *May 1, 2018

(54) POLYESTER DISPERSANTS, SYNTHESIS AND USE THEREOF

(71) Applicant: Chevron Oronite Company LLC, San Ramon, CA (US)

(72) Inventor: William Raymond Ruhe, Jr., Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/646,157

(22) Filed: Jul. 11, 2017

(65) Prior Publication Data

US 2018/0016513 A1    Jan. 18, 2018

Related U.S. Application Data

(63) Continuation-in-part of application No. 15/210,287, filed on Jul. 14, 2016.

(51) Int. Cl.
*C10M 145/22* (2006.01)
*C08G 63/685* (2006.01)

(52) U.S. Cl.
CPC ........ *C10M 145/22* (2013.01); *C08G 63/6856* (2013.01); *C10M 2209/102* (2013.01); *C10N 2230/02* (2013.01); *C10N 2240/102* (2013.01)

(58) Field of Classification Search
CPC ...... C10M 2215/042; C10M 2209/102; C10N 2210/02; C10N 2230/02; C10N 2240/102

USPC ......................................................... 508/240
See application file for complete search history.

(56) References Cited

U.S. PATENT DOCUMENTS

| | | | |
|---|---|---|---|
| 3,933,659 A * | 1/1976 | Lyle | ..................... C10M 163/00 252/75 |
| 5,352,377 A | 10/1994 | Blain et al. | |
| 6,617,303 B1 | 9/2003 | Smith et al. | |
| 8,581,006 B2 | 11/2013 | Gieselman et al. | |

* cited by examiner

*Primary Examiner* — Vishal Vasisth
(74) *Attorney, Agent, or Firm* — Terrance M. Flaherty

(57) ABSTRACT

A polyester composition, suitable for use as a dispersant in lubricating oils, is disclosed. The polyester composition is prepared by reacting (a) an acylating agent selected from an aliphatic-substituted succinic acylating agent, an aromatic polycarboxylic acylating agent, and combinations thereof; and (b) a hydroxyalkyl-substituted tertiary amine compound of the following structure:

$$R'-(OR)_z-N\begin{matrix}(RO)_xH\\ \\(RO)_yH\end{matrix}$$

wherein R' is a $C_{1-24}$ aliphatic group; R in each of the x (RO), y (RO) and z (RO) groups is independently $C_{2-4}$ alkylene; x+y is in a range of 2 to 7; and z is in a range of 1 to 5.

16 Claims, No Drawings

POLYESTER DISPERSANTS, SYNTHESIS AND USE THEREOF

REFERENCE TO RELATED APPLICATION

This application is a continuation-in-part of co-pending U.S. patent application Ser. No. 15/210,287, filed on Jul. 14, 2016, the disclosure of which is incorporated herein by reference in its entirety.

TECHNICAL FIELD

This disclosure relates to a novel polyester dispersant additive with soot handling attributes, its synthesis, and its use in lubricants, particularly for reducing soot-induced viscosity increase in heavy duty diesel engine lubricants.

BACKGROUND

Internal combustion engines function by the combustion of fuels which in turn generate the power needed to propel vehicles. In the case of a diesel engine, the fuel is a diesel fuel and the combustion thereof generally results in emissions from the exhausts of such vehicles which comprise three main components: soot and particulate matter, carbon monoxide and nitrogen oxides ($NO_x$). To alleviate environmental concerns, research is ongoing to reduce the levels of these emissions. $NO_x$ emissions can be reduced by lowering the temperature at which the fuel is combusted in the engine. Typically, this is achieved by retarding the combustion, i.e., by injecting the fuel shortly after the peak temperature is reached in the cylinder. However, this retarded combustion has the disadvantage that it causes more soot to accumulate in the engine lubricant partly due to incomplete combustion of the fuel because of the lower combustion temperature, and partly due to increased soot deposition on the cylinder wall which is drawn down into the lubricant with the downward stroke of the piston. The presence of soot in the lubricant has the adverse effect of causing viscosity increase and accelerated wear. It is important that soot induced viscosity increase be controlled such that the lubricant stays within viscosity grade in order to maintain its expected performance and to enable quick and clean drainage of the engine during servicing.

Lubricating oil compositions comprise a major amount of base oil and additives that improve the performance and increase the useful life of the lubricant. Nitrogen-containing dispersants are commonly used lubricant additives. The function of a dispersant is to maintain in suspension within the oil, insoluble materials formed by oxidation and other mechanisms during use of the oil, to prevent sludge flocculation and precipitation of the insoluble materials. Another function of the dispersant is to reduce the agglomeration of soot particles, thus reducing increases in the viscosity of the lubricating oil upon use. In the severe environment of diesel engines, it has been found that soot induced viscosity increase cannot be controlled by conventional dispersants, even when the amounts of such conventional dispersants are increased. Therefore, compounds providing potent soot dispersing properties and crankcase lubricants providing improved soot dispersing performance are continuously demanded.

The present disclosure provides a dispersant having improved performance in engine tests, providing a good viscosity index and good soot dispersion and toleration properties, particularly in diesel engines, and especially in heavy duty diesel engines employing exhaust gas recirculation.

SUMMARY

The present disclosure is directed in part to a polyester composition which may be added to lubricating oils and contributes to improvements in the viscosity characteristics, the dispersancy and amelioration of soot thickening, and to improving wear characteristics when employed in lubricating oil formulations for mechanical equipment.

In one aspect, there is provided a polyester composition which is a reaction product of (a) an acylating agent selected from an aliphatic-substituted succinic acylating agent, an aromatic polycarboxylic acylating agent, and a combination thereof; and (b) a hydroxyalkyl-substituted tertiary amine compound of the following structure:

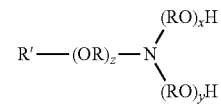

wherein R' is a $C_{1-24}$ aliphatic group; R in each of the x (RO), y (RO) and z (RO) groups is independently $C_{2-4}$ alkylene; x+y is in a range of 2 to 7; and z is in a range of 1 to 5.

In another aspect, there is provided a lubricating oil composition comprising a major amount of an oil of lubricating viscosity and a minor amount of any one of the embodiments described herein for the polyester composition.

In a further aspect, there is provided an additive concentrate comprising from 80 to 20 wt. % of an organic liquid diluent and from 20 to 80 wt. % of any one of the embodiments described herein for the polyester composition.

In yet a further aspect, there is provided a method for controlling soot-induced viscosity increase experienced in diesel engine lubricating oils during use in diesel engines, the method comprising employing as the diesel engine lubricating oil the lubricating oil composition disclosed herein.

In still yet a further aspect, there is provided a process for preparing a polyester composition which comprises reacting a mixture comprising: (a) an acylating agent selected from an aliphatic-substituted succinic acylating agent, an aromatic polycarboxylic acylating agent, and a combination thereof; and (b) a hydroxyalkyl-substituted tertiary amine compound of the following structure:

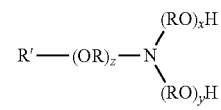

wherein R' is a $C_{1-24}$ aliphatic group; R in each of the x (RO), y (RO) and z (RO) groups is independently $C_{2-4}$ alkylene; x+y is in a range of 2 to 7; and z is in a range of 1 to 5; wherein a charge mole ratio of the hydroxyalkyl-substituted tertiary amine compound to the acylating agent in the mixture is maintained at 0.67 to 1.5:1.

DETAILED DESCRIPTION

Introduction

The following terms will be used throughout the specification and will have the following meanings unless otherwise indicated.

The term "aliphatic" or "aliphatic group" means a hydrocarbon moiety that may be straight-chain (i.e., unbranched), branched, or cyclic and may be completely saturated or may contain one or more units of unsaturation, but which is not aromatic.

The term "acylating agent" is intended to include carboxylic acids as well as acid-producing derivatives thereof such as anhydrides, esters, acyl halides and mixtures thereof, unless otherwise specifically stated.

The term "hydroxyalkyl" refers to a linear or branched alkyl radical having from 2 to 4 carbon atoms, in which one hydrogen atom is replaced by a hydroxyl group. Examples include those with a primary (terminal) hydroxyl group, such as 2-hydroxyethyl, 3-hydroxypropyl, 4-hydroxybutyl, or those with non-terminal hydroxyl groups, such as 1-hydroxyethyl, 1- or 2-hydroxypropyl, 1- or 2-hydroxybutyl, or 1-, 2- or 3-hydroxybutyl.

The term "oil-soluble" refers to a material that is soluble in mineral oil to the extent of at least 0.5 gram per liter at 25° C.

The term "polyester" is intended to embrace polymers wherein at least 85% of the recurring units are condensation products of dicarboxylic acids (or derivatives thereof such anhydrides, esters including half-esters, and halides) and dihydroxy compounds with linkages created by formation of ester units.

The term "tertiary amine" means any compound containing nitrogen, wherein the nitrogen itself makes only three single bonds to substituents that are not hydrogen. The nitrogen may be endo- or exocyclic, but not part of an amide, imide, sulfonamide, or sulfinamide.

Number average molecular weights ($M_n$) and molecular weight distribution ($MWD=M_w/M_n$, also referred to as polydispersity index or PDI) were determined by a Wyatt Technologies Gel Permeation Chromatography (GPC) system equipped a multi-angle light scattering detector (miniDAWN™ TREOS®), an interferometric refractometer (OPTILAB® T-rEX™), and a differential viscometer (ViscoStar™ II).

The total base number (TBN) values reported herein were measured according to ASTM D2896. The TBN refers to the amount of strong acid needed to neutralize all of a material's basicity, expressed as mg KOH per gram of sample.

The total acid number (TAN) values reported herein were measured according to ASTM D664. The TAN refers to the number of milligrams of potassium hydroxide (KOH) required to neutralize one gram of material.

Saponification numbers were measured by ASTM D94. The saponification number (SAP) refers to the number of milligrams of potassium hydroxide (KOH) required to saponify 1 g of material.

All ASTM standards referred to herein are the most current versions as of the filing date of the present application.

Acylating Agent

The acylating agent may be an aliphatic-substituted succinic acylating agent, an aromatic polycarboxylic acylating agent, or a combination thereof.

The aliphatic-substituted succinic acylating agent can include succinic acids, anhydrides, esters (including half-esters), and halides. The aliphatic group generally contains an average of at least 8, or at least 20, or at least 30, or at least 35, up to 350, or to 200, or up to 100 carbon atoms.

The aliphatic group of the aliphatic-substituted succinic acylating agent may be derived from a polyalkene having a number average molecular weight ($M_n$) of from 500 to 5000 (e.g., from 750 to 3000, or from 900 to 2500). In one embodiment, the polyalkene is polyisobutene (PIB). For example, the aliphatic-substituted succinic acylating agent may be a polyisobutenyl succinic anhydride (PIBSA) in which the polyisobutenyl group has a number average molecular weight ($M_n$) of from 500 to 5000 (e.g., from 750 to 3000, or from 900 to 2500).

The aliphatic group of the aliphatic-substituted succinic acylating agent may be a polyalkylene, which may be linear and contain from 12 to 20 carbon atoms. Representative examples of $C_{12\text{-}20}$-aliphatic-substituted succinic acylating agents include dodecenyl succinic anhydride, hexadecenyl succinic anhydride, and octadecenyl succinic anhydride.

When a high molecular weight aliphatic-substituted succinic acylating agent (e.g., PIBSA in which the polyisobutenyl group has a $M_n$ of from 500 to 5000) is used, it may be desirable to add a relatively lower molecular weight $C_{12\text{-}20}$-aliphatic-substituted succinic acylating agent (e.g., a one or more of dodecenyl succinic anhydride, hexadecenyl succinic anhydride, and octadecenyl succinic anhydride) or an aromatic polycarboxylic acylating agent to increase the nitrogen content of the resulting polyester composition.

Examples of suitable aromatic polycarboxylic acylating agents include phthalic acid, phthalic anhydride, isophthalic acid, terephthalic acid, trimellitic acid, trimellitic anhydride, pyromellitic acid, pyromellitic dianhydride, 1,8-naphthalic anhydride, 2,3-naphthalic anhydride, and 2,3,7,8-naphthalic dianhydride.

Hydroxyalkyl-Substituted Tertiary Amine Compound

The hydroxyalkyl-substituted tertiary amine compound has the following structure (1):

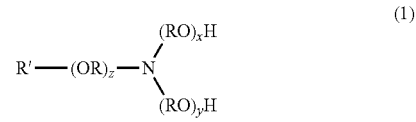

(1)

wherein (a) R' is a $C_{1\text{-}24}$ (e.g., $C_{8\text{-}24}$, $C_{10\text{-}22}$ or $C_{12\text{-}18}$) aliphatic group; (b) R in each of the x (RO), y (RO) and z (RO) groups is independently $C_{2\text{-}4}$ alkylene; (c) x+y is in a range of 2 to 7 (e.g., 2 to 5, 2 to 4 or 2 to 3); and (d) z is in a range of 1 to 5 (e.g., 1 to 4, 1 to 3, 2 to 5, 2 to 4, or 2 to 3). In some embodiments, x+y=2. In some embodiments, R' may be a $C_{1\text{-}24}$ (e.g., $C_{8\text{-}24}$, $C_{10\text{-}22}$ or $C_{12\text{-}18}$) alkyl group.

Conveniently, R in each of the x (RO), y (RO) and z (RO) groups of structure (1) may be independently ethylene or propylene. For example, R in each of the x (RO) and they (RO) groups may be ethylene while R in the z (RO) group may be propylene. Stated differently, the hydroxyalkyl-substituted tertiary amine compound may have the following structure (2):

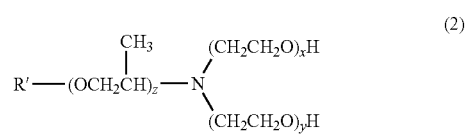

(2)

wherein R', x, y and z are as described herein above. ps
Polyester Synthesis

The polyester composition described herein may be produced by conventional polycondensation techniques. In one embodiment, the hydroxyalkyl-substituted tertiary amine and acylating agent components are charged into a conventional polymerization vessel and reacted between 150° C. and 260° C. for a period of from 2 to 20 hours (e.g., 4 to 10 hours). Optionally, an esterification catalyst may be used to decrease the reaction time and/or temperature.

The esterification reaction may be conducted at about atmospheric pressure (about 101 kPa); however, higher or lower pressures can also be used. Water, present in the system or generated by this reaction, may be removed from the reaction system during the reaction via stripping under nitrogen. Reduced pressures can be applied to facilitate the elimination of the water formed during the reaction. It may be desirable to conduct the esterification reaction in an inert organic solvent. Optimum solvents will vary and can be determined from literature sources or routine experiments.

The charge mole ratio (CMR) of hydroxyalkyl-substituted tertiary amine compound to acylating agent is maintained at about 0.67 to 1.5:1 (e.g., 0.8 to 1.25:1, or 0.9 to 1.1:1).

The esterification reaction may be conducted in the presence of a polyhydric alcohol such as a poly(oxyalkylene) polyol having from 2 to 15 $C_{2-4}$ alkylene oxide units per molecule (e.g., from 5 to 15 $C_{2-4}$ alkylene oxide units per molecule). Representative poly(oxyalkylene) polyols include polyethylene glycols (e.g., polyethylene glycol 200, polyethylene glycol 300, polyethylene glycol 400, polyethylene glycol 600), polypropylene glycols (e.g., polypropylene glycol 400, polypropylene glycol 725), and polybutylene glycols. When a poly(oxyalkylene) polyol is used, the CMR of [(hydroxyalkyl-substituted tertiary amine compound)+(polyhydric alcohol)] to acylating agent is maintained at about 0.67 to 1.5:1 (e.g., 0.8 to 1.25:1, or 0.9 to 1.1:1).

The esterification reaction may be conducted in the presence of an aliphatic dicarboxylic acid having 6 to 20 carbon atoms (e.g., 6 to 12 carbon atoms). Representative aliphatic dicarboxylic acids include cyclohexanedicarboxylic acids, adipic acid, pimelic acid, suberic acid, azelaic acid, sebacic acid, undecanedioic acid, and dodecanedioic acid. When used, the CMR of the hydroxyalkyl-substituted tertiary amine compound to [(acylating agent)+(aliphatic dicarboxylic acid)] is maintained at about 0.67 to 1.5:1 (e.g., 0.8 to 1.25:1, or 0.9 to 1.1:1).

Lubricating Oil Additive Concentrate

The polyester composition described herein may be provided as an additive package or concentrate in which the polyester composition is incorporated into a substantially inert, normally liquid organic diluent such as mineral oil to form an additive concentrate. Typically, a neutral oil having a kinematic viscosity of 4 to 8.5 mm²/s at 100° C. (e.g., 4 to 6 mm²/s at 100° C.) will be used as the diluent, though synthetic oils, as well as other organic liquids which are compatible with the additive and finished lubricating oil can also be used.

Typically, the concentrates contain sufficient diluent to make them easy to handle during shipping and storage. These concentrates usually include from 80 to 20 wt. % of an organic liquid diluent and from 20 to 80 wt. % of the polyester composition described herein.

Lubricating Oil Composition

The oil-soluble polyester composition described herein is typically added to a base oil in sufficient amounts to provide soot and/or sludge dispersancy and/or wear control and/or viscosity index improvement when used in lubricating oil compositions for internal combustion engines. Generally, the lubricating oil compositions will contain a major amount of base oil of lubricating viscosity and a minor amount of the polyester composition of the present disclosure.

A "major amount" of a base oil refers to a concentration of the base oil within the lubricating oil composition of greater than 50 wt. % (e.g., at least 60 wt. %, at least 70 wt. %, at least 80 wt. %, at least 85 wt. %, at least 90 wt. %, from 80 to 99.95 wt. %, from 80 to 98 wt. %, from 85 to 99.5 wt. %, or from 85 to 98 wt. %).

The amount of the oil-soluble polyester composition in the lubricating oil composition will be in a minor amount compared to the base oil of lubricating viscosity. On an active ingredient basis (i.e., excluding the weight of organic liquid diluent), the lubricating oil composition may comprise from 0.5 to 15 wt. % (e.g., from 1 to 10 wt. %, from 5 to 10 wt. %, or from 5 to 8 wt. %) of the polyester composition described herein.

The lubricating oil which may be used herein includes a wide variety of hydrocarbon oils, such as naphthenic bases, paraffin bases and mixed base oils as well as synthetic oils such as esters and the like. The lubricating oils which may be used also include oils from biomass such as plant and animal derived oils. The lubricating oils may be used individually or in combination and generally have a kinematic viscosity which ranges from 3 to 20 mm²/s at 100° C. Thus, the base oil can be a refined paraffin type base oil, a refined naphthenic base oil, or a synthetic hydrocarbon or non-hydrocarbon oil of lubricating viscosity. The base oil can also be a mixture of mineral and synthetic oils. Mineral oils for use as the base oil herein include, for example, paraffinic, naphthenic and other oils that are ordinarily used in lubricating oil compositions. Synthetic oils include, for example, both hydrocarbon synthetic oils and synthetic esters and mixtures thereof having the desired viscosity. Hydrocarbon synthetic oils may include, for example, oils prepared from the polymerization of ethylene, i.e., polyalphaolefin (PAO), or from hydrocarbon synthesis procedures using carbon monoxide and hydrogen gases such as in a Fisher-Tropsch process. Useful synthetic hydrocarbon oils include liquid polymers of alpha olefins having the proper viscosity. Likewise, alkyl benzenes of proper viscosity, such as didodecyl benzene, can be used. Useful synthetic esters include the esters of monocarboxylic acids and polycarboxylic acids, as well as mono-hydroxy alkanols and polyols. Typical examples are didodecyl adipate, pentaerythritol tetracaproate, di-2-ethylhexyl adipate, dilaurylsebacate, and the like. Complex esters prepared from mixtures of mono and dicarboxylic acids and mono and dihydroxy alkanols can also be used. Blends of mineral oils with synthetic oils are also useful.

The lubricating oil composition containing the polyester additives of this disclosure can be prepared by admixing, by conventional techniques, the appropriate amount of the polyester additives of this disclosure with a lubricating oil. The selection of the particular base oil depends on the contemplated application of the lubricant and the presence of other additives.

Additional Additives

If desired, other additives may be included in the lubricating oil and lubricating oil concentrate compositions disclosed herein. These additives include demulsifiers, detergents, dispersants, extreme pressure agents, foam inhibitors, friction modifiers, multifunctional additives, oxidation inhibitors, pour point depressants, rust inhibitors, wear inhibitors, and the like.

Demulsifiers are used to aid the separation of an emulsion. Examples of demulsifiers include block copolymers of polyethylene glycol and polypropylene glycol, polyethoxylated alkylphenols, polyesteramides, ethoxylated alkylphenol-formaldehyde resins, polyvinyl alcohol derivatives and cationic or anionic polyelectrolytes.

Detergents which may be employed herein include alkyl or alkenyl aromatic sulfonates, metal salicylates, calcium phenates, borated sulfonates, sulfurized or unsulfurized metal salts of multi-hydroxy alkyl or alkenyl aromatic compounds, alkyl or alkenyl hydroxy aromatic sulfonates, sulfurized or unsulfurized alkyl or alkenyl naphthenates, metal salts of alkanoic acids, metal salts of an alkyl or alkenyl multi-acid, and chemical and physical mixtures thereof.

Dispersants diffuse sludge, carbon, soot, oxidation products, and other deposit precursors to prevent them from coagulating resulting in reduced deposit formation, less oil oxidation, and less viscosity increase. Examples of dispersants include alkenyl succinimides, alkenyl succinimides modified with other organic compounds, alkenyl succinimides modified by post-treatment with ethylene carbonate or boric acid, alkali metal or mixed alkali metal, alkaline earth metal borates, dispersions of hydrated alkali metal borates, dispersions of alkaline-earth metal borates, polyamide ashless dispersants and the like or mixtures of such dispersants.

Extreme pressure agents are used to prevent sliding metal surfaces from seizing under conditions of extreme pressure. Examples of extreme pressure agents include sulfurized animal or vegetable fats or oils, sulfurized animal or vegetable fatty acid esters, fully or partially esterified esters of trivalent or pentavalent acids of phosphorus, sulfurized olefins, dihydrocarbyl polysulfides, sulfurized Diels-Alder adducts, sulfurized dicyclopentadiene, sulfurized or co-sulfurized mixtures of fatty acid esters and monounsaturated olefins, co-sulfurized blends of fatty acid, fatty acid ester and alpha-olefin, functionally-substituted dihydrocarbyl polysulfides, thia-aldehydes, thia-ketones, epithio compounds, sulfur-containing acetal derivatives, co-sulfurized blends of terpene and acyclic olefins, and polysulfide olefin products, and amine salts of phosphoric acid esters or thiophosphoric acid esters.

Foam inhibitors are used to reduce the foaming tendencies of the lubricating oil. Examples of foam inhibitors include alkyl methacrylate polymers, alkylacrylate copolymers, and polymeric organosiloxanes such as dimethylsiloxane polymers.

Friction modifiers can lower the friction between moving parts. Examples of friction modifiers include fatty alcohols, alkyls, amines, ethoxylated amines, borated esters, other esters, phosphates, phosphites and phosphonates.

Metal deactivators create a film on metal surfaces to prevent the metal from causing the oil to be oxidized. Examples of metal deactivators include disalicylidene propylenediamine, triazole derivatives, thiadiazole derivatives, bis-imidazole ethers, and mercaptobenzimidazoles.

Additives with multiple properties such as anti-oxidant and anti-wear properties may also be added to the lubricating oil. Examples of such multifunctional additives include sulfurized oxymolybdenum dithiocarbamate, sulfurized oxymolybdenum organo phosphorodithioate, oxymolybdenum monoglyceride, oxymolybdenum diethylate amide, amine-molybdenum complexes, and sulfur-containing molybdenum complexes.

Oxidation inhibitors reduce the tendency of mineral oils to deteriorate by inhibiting the formation of oxidation products such as sludge and varnish-like deposits on the metal surfaces. Examples of oxidation inhibitors include (a) phenolic-type oxidation inhibitors, such as 4,4'-methylene-bis (2,6-di-tert-butylphenol), 4,4'-bis(2,6-di-tert-butylphenol), 4,4'-bis(2-methyl-6-tert-butylphenol), 2,2'-methylene-bis(4-methyl-6-tert-butylphenol), 4,4'-butylidene-bis(3-methyl-6-tert-butylphenol), 4,4'-isopropylidene-bis(2,6-di-tert-butylphenol), 2,2'-methylene-bis(4-methyl-6-nonylphenol), 2,2'-isobutylidene-bis(4,6-dimethylphenol), 2,2'-5-methylene-bis(4-methyl-6-cyclohexylphenol), 2,6-di-tert-butyl-4-methylphenol, 2,6-di-tert-butyl-4-ethylphenol, 2,4-dimethyl-6-tert-butyl-phenol, 2,6-di-tert-butyl-dimethylamino-p-cresol, 2,6-di-tert-4-(N,N'-dimethylaminomethylphenol), 4,4'-thiobis(2-methyl-6-tert-butylphenol), 2,2'-thiobis(4-methyl-6-tert-butylphenol), bis (3-methyl-4-hydroxy-5-tert-10-butylbenzyl)-sulfide, and bis (3,5-di-tert-butyl-4-hydroxybenzyl); and (b) diphenylamine-type oxidation inhibitors such as alkylated diphenylamine, phenyl-alpha-naphthylamine, and alkylated-alpha-naphthylamine Other types of oxidation inhibitors include metal dithiocarbamates (e.g., zinc dithiocarbamate), and methylenebis(dibutyldithiocarbamate).

Pour point depressants are polymers that are designed to control wax crystal formation in lubricating oils resulting in lower pour point and improved low temperature flow performance. Examples of pour point depressants include polymethyl methacrylate, ethylene vinyl acetate copolymers, polyethylene polymers, and alkylated polystyrenes.

Rust inhibitors reduce corrosion on materials normally subject to corrosion. Examples of anti-rust agents include nonionic polyoxyethylene surface active agents such as polyoxyethylene lauryl ether, polyoxyethylene higher alcohol ether, polyoxyethylene nonyl phenyl ether, polyoxyethylene octyl phenyl ether, polyoxyethylene octyl stearyl ether, polyoxyethylene oleyl ether, polyoxyethylene sorbitol monostearate, polyoxyethylene sorbitol mono-oleate, and polyethylene glycol mono-oleate. Other compounds useful as anti-rust agents include stearic acid and other alkyls, dicarboxylic acids, metal soaps, alkyl amine salts, metal salts of heavy sulfonic acid, partial carboxylic acid ester of polyhydric alcohol, and phosphoric ester.

Viscosity index improvers, also known as viscosity modifiers, comprise a class of additives that improve the viscosity-temperature characteristics of the lubricating oil, making the oil's viscosity more stable as its temperature changes. Examples of viscosity index improvers include polymethacrylate type polymers, ethylene-propylene copolymers, styrene-isoprene copolymers, hydrated styrene-isoprene copolymers, and polyisobutylene.

EXAMPLES

The following illustrative examples are intended to be non-limiting.

Example 1

Octadecenylsuccinic anhydride (178.55 g; SAP=313.75 mg KOH/g) was charged to a 0.5-liter glass reactor that was equipped with an overhead stirrer, thermocouple and nitrogen inlet. The reactor was then purged with a constant nitrogen flow of about 180 mL/min. The octadecenylsuccinic anhydride was heated under a nitrogen atmosphere to 100° C. Then, an alkoxylated tertiary amine (218.18 g; TBN=128.38 mg KOH/g) was added slowly to the reactor over 4 minutes at a temperature range of 100° C.-124° C. The alkoxylated tertiary amine has the following structure:

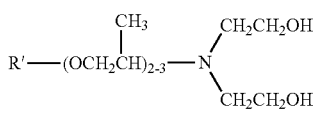

wherein R' is an alkyl group having from 12 to 14 carbon atoms. The reaction mixture then was heated to 200° C. for 4 hours. Vacuum (<10 mm Hg (abs)) was applied to the reactor for 30 minutes. The reaction mixture was then cooled to room temperature.

The product had the following properties: nitrogen=1.89 wt. %; TBN=72.42 mg KOH/g; TAN=6.9 mg KOH/g; kinematic viscosity at 100° C.=95.07 mm²/s; $M_n$=2873; PDI=2.41.

Example 2

Octadecenylsuccinic anhydride (172.72 g; SAP=313.75 mg KOH/g) was charged to a 0.5-liter glass reactor that was equipped with an overhead stirrer, thermocouple and nitrogen inlet. The reactor was then purged with a constant nitrogen flow of about 180 mL/min. The octadecenylsuccinic anhydride was heated under a nitrogen atmosphere to 95° C. Then, an alkoxylated tertiary amine (271.93 g; TBN=99.63 mg KOH/g) was added slowly to the reactor over 7 minutes at a temperature range of 95° C.-109° C. The alkoxylated tertiary amine has the following structure:

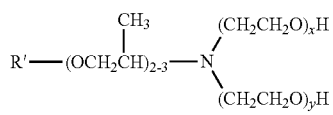

wherein R' is an alkyl group having from 12 to 14 carbon atoms and x+y=3.

The reaction mixture then was heated to 200° C. for 4 hours. Vacuum (<45 mm Hg (abs)) was applied to the reactor for 30 minutes. The reaction mixture was then cooled to room temperature.

The product analytical results are as follows: nitrogen=1.55 wt. %; TBN=62.23 mg KOH/g; TAN=8.8 mg KOH/g; kinematic viscosity at 100° C.=85.85 mm²/s; $M_n$=2178; PDI=2.17.

Baseline Formulation A

A baseline lubricating oil composition was prepared which contained conventional amounts of an oxidation inhibitor package, a calcium-based detergent package containing a phenate and sulfonates, zinc dithiophosphate, viscosity index improver, pour point depressant, foam inhibitor and the balance lube oil.

Example 3

A lubricating oil composition was prepared by adding approximately 6 wt. % of the additive prepared in Example 1 to Baseline Formulation A.

Example 4

A lubricating oil composition was prepared by adding approximately 6 wt. % of the additive prepared in Example 2 to Baseline Formulation A.

Comparative Example A

A lubricating oil composition was prepared by adding approximately 6 wt. % of a bis-succinimide dispersant derived from ethyleneamine E-100 (Huntsman Corporation) and 2300 MW PIB to Baseline Formulation A.

Performance Testing

Lubricating oils (Examples 3-4 and Comparative Example A) were evaluated for dynamic viscosity using a soot test, which measures the ability of the formulation to disperse and control viscosity increase resulting from the addition of carbon black, a soot surrogate. In this test, glass tubes were charged with 40 g of lubricating oil and affixed to a condenser. Each oil was heated at 200° C. with 115 mL/min of air flow bubbling through the oil for 8 hours. Then, 0.5 g of VULCAN® XC72R carbon black (Cabot Corporation) was added to 12 g of each oxidized oil. The resulting mixture was heated in a 60° C. oven for 16 hours. After removal from the oven, the mixture was stirred for 1 minute and then homogenized using a paint shaker for 30 minutes to completely disperse the carbon black. The mixture was then heated in a vacuum oven (full vacuum, <25 mm Hg) at 100° C. for 30 minutes. The mixture was removed from the vacuum oven and stirred using a vortex mixer for 30 seconds just prior to measuring viscosity. The dynamic viscosity of each lubricating oil containing carbon black was then measured at 100° C. for 900 seconds at a shear rate of 0.65 s$^{-1}$ on a TA Instruments AR-G2 rheometer using a cone and plate geometry, wherein the cone is stainless steel with a 60 mm diameter and a 2° angle. Sample temperature was controlled with a Peltier plate temperature control system. The dynamic viscosity was calculated as the average dynamic viscosity of the lubricating oil from 600-900 seconds. The results of the soot test are summarized in Table 1. Lower dynamic viscosity indicates improved soot dispersion.

TABLE 1

Soot Test Results

| Example | Dynamic Viscosity, Pascal-sec |
|---|---|
| 3 | 0.87 |
| 4 | 0.08 |
| Comparative A | 0.824 |

The soot dispersancy of lubricating oil compositions of Examples 3-4 were either significantly improved or comparable to the comparative example.

The invention claimed is:

1. A polyester composition comprising a reaction product of:
   (a) an acylating agent selected from an aliphatic-substituted succinic acylating agent, an aromatic polycarboxylic acylating agent, and combinations thereof;
   (b) a hydroxyalkyl-substituted tertiary amine compound of the following structure:

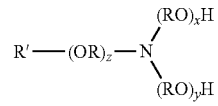

wherein R' is a $C_{1-24}$ aliphatic group; R in each of the x (RO), y (RO) and z (RO) groups is independently $C_{2-4}$ alkylene; x+y is in a range of 2 to 7; and z is in a range of 1 to 5; and (c) a poly(oxyalkyene) polyol having from 2 to 15 $C_{2-4}$ alkylene oxide units per molecule.

2. The composition of claim 1, wherein the aliphatic-substituted succinic acylating agent is selected from one or more of dodecenyl succinic anhydride, hexadecenyl succinic anhydride, and octadecenyl succinic anhydride, and polyisobutenyl succinic anhydride.

3. The composition of claim 1, wherein the aromatic polycarboxylic acylating agent is selected from one or more of phthalic acid, phthalic anhydride, isophthalic acid, terephthalic acid, trimellitic acid, trimellitic anhydride, pyromellitic acid, pyromellitic dianhydride, 1,8-naphthalic anhydride, 2,3-naphthalic anhydride, and 2,3,7,8-naphthalic dianhydride.

4. The composition of claim 1, wherein R' is a $C_{8-24}$ alkyl group.

5. The composition of claim 1, wherein R in each of the x (RO) and y (RO) groups is ethylene and R in each of the z (RO) groups is propylene.

6. The composition of claim 1, wherein x+y is in the range of 2 to 5.

7. The composition of claim 1, wherein z is in the range of 2 to 3.

8. A lubricating oil additive concentrate comprising from 80 to 20 wt. % of an organic liquid diluent and from 20 to 80 wt. % of the polyester composition of claim 1.

9. A lubricating oil composition comprising (a) a major amount of an oil of lubricating viscosity and (b) from 0.05 to 15 wt. %, based on the total weight of the lubricating oil composition, of the polyester composition of claim 1.

10. The lubricating oil composition of claim 9, further comprising an additive selected from one or more of demulsifiers, detergents, dispersants, extreme pressure agents, foam inhibitors, friction modifiers, multifunctional additives, oxidation inhibitors, pour point depressants, rust inhibitors, and wear inhibitors.

11. A method for controlling soot-induced viscosity increase experienced in diesel engine lubricating oils during use in diesel engines, the method comprising employing as the diesel engine lubricating oil the lubricating oil composition of claim 9.

12. A process for preparing the polyester composition of claim 1, the process comprising reacting a mixture comprising:

(a) the acylating agent;
(b) the hydroxyalkyl-substituted tertiary amine compound; and
(c) the poly(oxyalkyene) polyol;

wherein a charge mole ratio of the hydroxyalkyl-substituted tertiary amine compound and poly(oxyalkylene) polyol to the acylating agent in the mixture is maintained at 0.67 to 1.5:1.

13. The process of claim 12, wherein the mixture is maintained at a temperature of 150° C. to 260° C.

14. The process of claim 12, wherein the poly(oxyalkylene)polyol is selected from one or more of polyethylene glycol 200, polyethylene glycol 300, polyethylene glycol 400, polyethylene glycol 600, polypropylene glycol 400, and polypropylene glycol 725.

15. The polyester composition of claim 1, wherein the poly(oxyalkyene) polyol has from 5 to 15 $C_{2-4}$ alkylene oxide units per molecule.

16. The polyester composition of claim 1, wherein the poly(oxyalkylene)polyol is selected from one or more of polyethylene glycol 200, polyethylene glycol 300, polyethylene glycol 400, polyethylene glycol 600, polypropylene glycol 400, and polypropylene glycol 725.

* * * * *